(12) United States Patent
Mueller et al.

(10) Patent No.: US 8,585,524 B2
(45) Date of Patent: Nov. 19, 2013

(54) METHOD OF CONTROLLING A DRIVE AND DRIVE SYSTEM

(75) Inventors: Matthias Mueller, Neusaess (DE); Steffen Mutschler, Nue-uem (DE)

(73) Assignee: Robert Bosch GmbH, Stuttgart (DE)

( * ) Notice: Subject to any disclaimer, the term of this patent is extended or adjusted under 35 U.S.C. 154(b) by 1199 days.

(21) Appl. No.: 12/518,219

(22) PCT Filed: Dec. 7, 2007

(86) PCT No.: PCT/EP2007/010670
§ 371 (c)(1),
(2), (4) Date: Jun. 8, 2009

(87) PCT Pub. No.: WO2008/068036
PCT Pub. Date: Jun. 12, 2008

(65) Prior Publication Data
US 2010/0069193 A1 Mar. 18, 2010

(30) Foreign Application Priority Data
Dec. 8, 2006 (DE) .......................... 10 2006 058 003

(51) Int. Cl.
*F16H 47/04* (2006.01)
(52) U.S. Cl.
USPC ............................................... 475/72; 475/80
(58) Field of Classification Search
USPC ....................................................... 475/72–82
See application file for complete search history.

(56) References Cited

U.S. PATENT DOCUMENTS

| 4,364,229 A | 12/1982 | Shiber |
| 4,815,334 A * | 3/1989 | Lexen .............................. 475/75 |
| 6,852,056 B2 * | 2/2005 | Weeramantry ................... 475/73 |
| 2004/0014557 A1 | 1/2004 | Carlson et al. |
| 2006/0137925 A1 | 6/2006 | Viergever et al. |

FOREIGN PATENT DOCUMENTS

| DE | 29 41 501 A1 | 4/1981 |
| DE | 44 17 335 A1 | 3/1995 |
| DE | 199 34 696 A1 | 5/2001 |
| EP | 0 304 919 | 3/1989 |

* cited by examiner

*Primary Examiner* — David D Le
*Assistant Examiner* — Derek D Knight
(74) *Attorney, Agent, or Firm* — Scully, Scott, Murphy & Presser, P.C.

(57) ABSTRACT

The invention relates to a method for controlling a drive system (1) and to a drive system (1) having a drive machine (2) which is connected to a first element (6) of an epicyclic gearing (5). The drive system (1) also comprises a shift gearing (4) which is connected to a third element (9) of the epicyclic gearing. Also provided is a hydrostatic machine (3) which is connected to a second element (7) of the epicyclic gearing (5). The hydrostatic machine (3) is set to a negligible displacement volume ($V_{hM}$) A gear stage of the shift gearing (4) is engaged. The displacement volume ($V_{hM}$) of the hydrostatic machine (3) is increased and the hydrostatic machine (3) charges a hydraulic accumulator (26). After moment equilibrium is reached in the epicyclic gearing (5), the displacement volume ($V_{hM}$) of the hydrostatic machine (3) is supplied to the epicyclic gearing (5). In the event of synchronization of the epicyclic gearing (5), a clutch (12) for blocking the epicyclic gearing (5) is closed. The hydraulic accumulator (26) is discharged further via the hydrostatic machine (3) and adds a torque generated by the drive machine (2).

7 Claims, 4 Drawing Sheets

Figure 1:
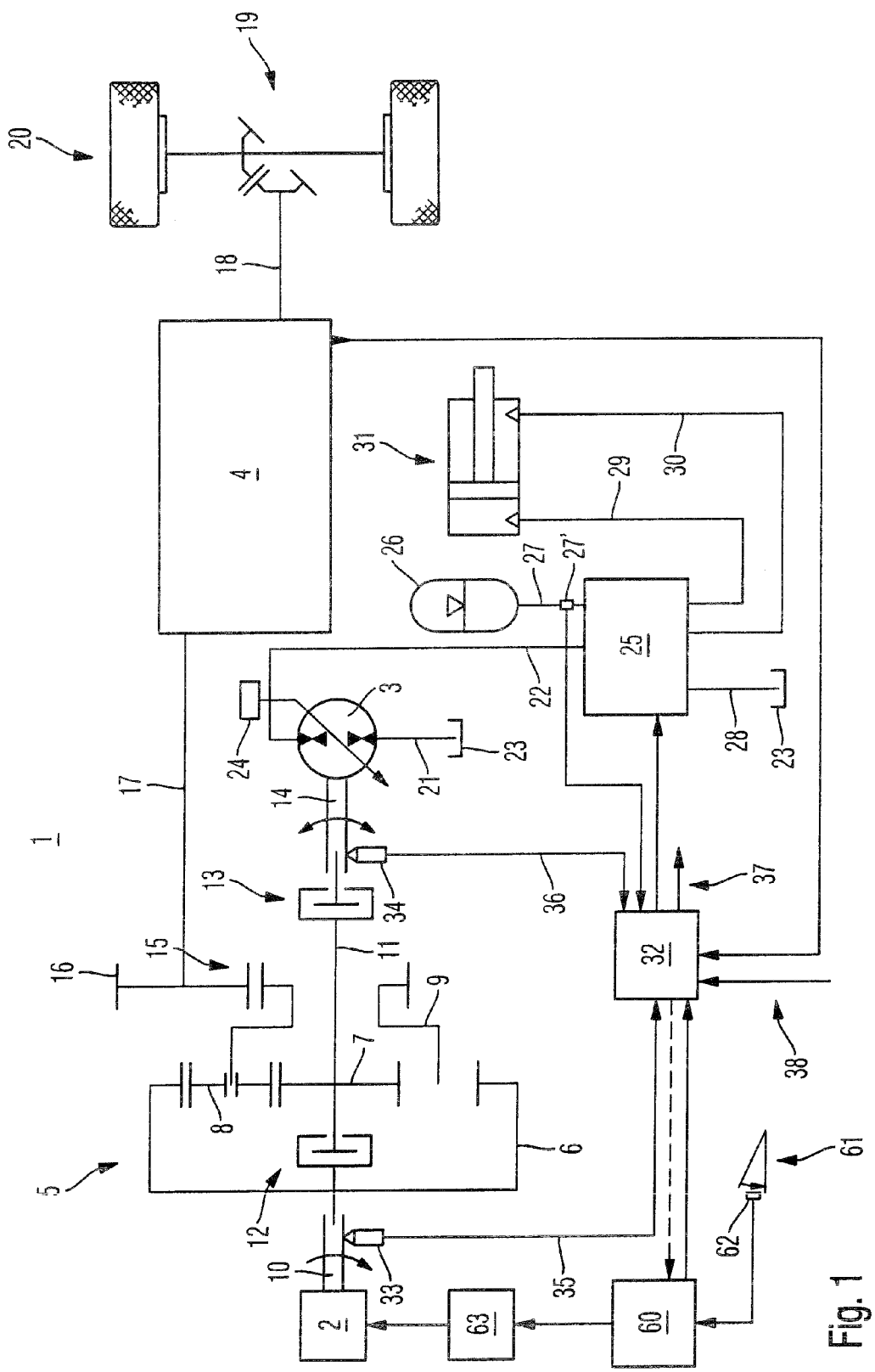

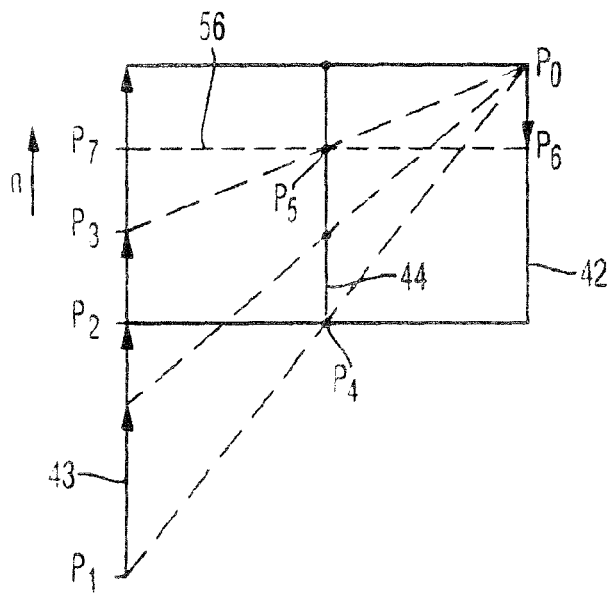
Fig. 4
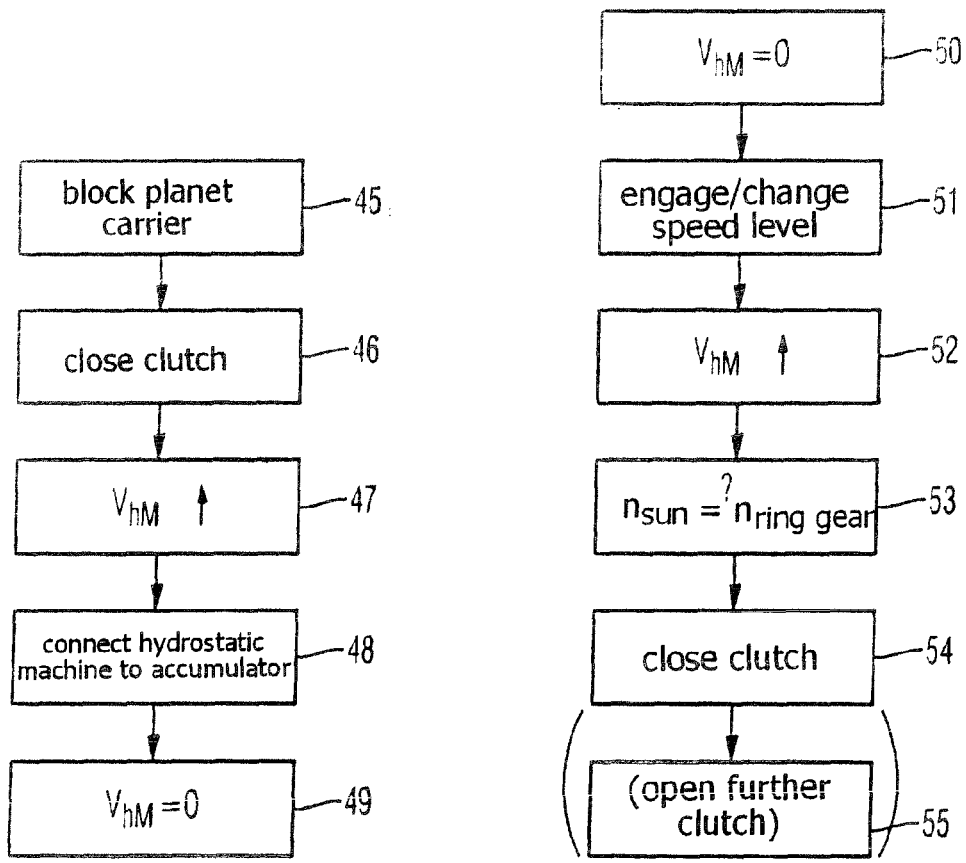
Fig. 5
Fig. 6

METHOD OF CONTROLLING A DRIVE AND DRIVE SYSTEM

The invention relates to a method of controlling a drive as well as to a drive system comprising a prime mover, an epicyclic gearbox and a shift transmission.

From DE 199 34 696 A1 an electrodynamic drive system is known. The electrodynamic drive system comprises a prime mover that is connected by an epicyclic gearbox to a shift transmission. The epicyclic gearbox comprises three elements. A first element of the epicyclic gearbox is connected to the prime mover. A second element of the epicyclic gearbox is connected to an electric motor. The third element of the epicyclic gearbox is connected to the rear-mounted shift transmission. The epicyclic gearbox replaces a friction clutch and/or a hydrodynamic converter. A speed synchronization between the first element of the epicyclic gearbox, which is connected to the prime mover, and a transmission input shaft, which is connected to the third element of the epicyclic gearbox, is effected by power acceptance by the electric motor.

The known electrodynamic drive system has the drawback that an electric motor is used to accept the power during the synchronization of the shift transmission input with the prime mover. The energy that is therefore gained from the energy released during the synchronization is present as electrical energy and may be supplied only to consumers capable of accepting electric power. Thus, use is restricted to drive systems that have an electrical distribution system in the vehicle.

The object of the invention is to provide a method of controlling a drive as well as a drive system, with which the gained energy may easily be re-used efficiently and flexibly.

The object is achieved by the method according to the invention according to claim 1 and by the drive system according to the invention according to claim 8.

According to the invention, the drive system comprises a prime mover that is connected to a first element of an epicyclic gearbox. The drive system further comprises a clutch, by which the first element is releasably connected to a second element of the epicyclic gearbox. A shift transmission is further provided, which is connected to a third element of the epicyclic gearbox. The second element of the epicyclic gearbox is connected to a hydrostatic machine, the displacement volume of which is adjustable. For the storage and direct recovery of energy during a starting operation or a shift operation, the hydrostatic machine is first set to a vanishing displacement volume. In this state, the epicyclic gearbox is torque-free and a gear of the shift transmission may be engaged. For driving-away and/or synchronization, first the displacement volume of the hydrostatic machine is increased.

The hydrostatic machine is therefore operated as a pump and charges a hydraulic accumulator. Charging of the hydraulic accumulator continues until a torque equilibrium is reached. The further increase of the displacement volume of the hydrostatic machine leads to a reversal of the energy flow. The hydraulic accumulator discharges via the hydrostatic machine and therefore supplies a torque to the epicyclic gearbox. In the epicyclic gearbox the rotational speed of two elements of the epicyclic gearbox is acquired. If a vanishing rotational speed difference or the fulfillment of another rotational-speed-dependent criterion between two elements of the epicyclic gearbox is detected, then the clutch is closed to block the epicyclic gearbox. For further acceleration, the hydraulic accumulator continues to be discharged via the hydrostatic machine, with the result that the primary energy to be summoned up by the prime mover is reduced.

Advantageous developments of the method according to the invention and of the drive system according to the invention are outlined in the sub-claims.

In particular, it is advantageous that the hydrostatic machine is connected by means of a valve device to the hydraulic accumulator or to a hydraulic system for implement operation. This allows the hydrostatic machine of the drive system according to the invention to be used to supply pressure medium to the hydraulic system for implement operation. For this purpose, the shift transmission is brought into a neutral position and the epicyclic gearbox is blocked by closing of the clutch. The drive power of the prime mover is therefore supplied to the hydrostatic machine, which operates as a pump. The pressure medium pressurized by the hydrostatic machine is supplied to a hydraulic system for implement operation.

According to a further preferred form of implementation, for a normal travel operation, during which the hydrostatic machine is not used for torque addition and/or the recovery of energy, the hydrostatic machine is uncoupled from the epicyclic gearbox by means of a further clutch. This prevents losses through the hydrostatic machine. For implementing a speed level or gear change in the shift transmission, preferably first the clutch is opened and hence the blocking of the epicyclic gearbox is cancelled. Then the displacement volume of the hydrostatic machine is set to zero, so that the epicyclic gearbox is torque-free. In this state, a gear change may be effected in the shift transmission as an easy speed synchronization is possible in the epicyclic gearbox. The speed compensation is effected via the element of the epicyclic gearbox that is connected to the hydrostatic machine. Because of the swivelling to zero of the hydrostatic machine, this element may rotate freely. To restore the frictional connection between the prime mover and the shift transmission, the hydrostatic machine is then swivelled out once more in the direction of a larger displacement volume.

According to a further preferred form of implementation, the clutch takes the form of a friction clutch. Thus, in order to assist the speed compensation, the clutch may be closed with an increasing pressing force. By virtue of the friction that consequently additionally arises, the synchronization is improved.

It is further advantageous that the hydrostatic machine is used to start the prime mover. For this purpose, the hydrostatic machine is set to a displacement volume differing from zero and the third element of the epicyclic gearbox that is connected to the shift transmission is blocked. The hydrostatic machine is connected to the hydraulic accumulator and acts as a hydraulic motor, which starts the drive motor.

In an alternative form of implementation, the prime mover may also be started by means of the hydrostatic machine by closing the clutch for the starting operation. In this case, in order to prevent a load torque the shift transmission is to be brought into its neutral position. In the closed state of the clutch, the hydrostatic machine and the prime mover are connected rigidly to one another and the necessary speed compensation is effected via the second element of the epicyclic gearbox that is connected to the shift transmission. As the shift transmission is situated in neutral position, the second element of the epicyclic gearbox may rotate freely.

Figure 2:
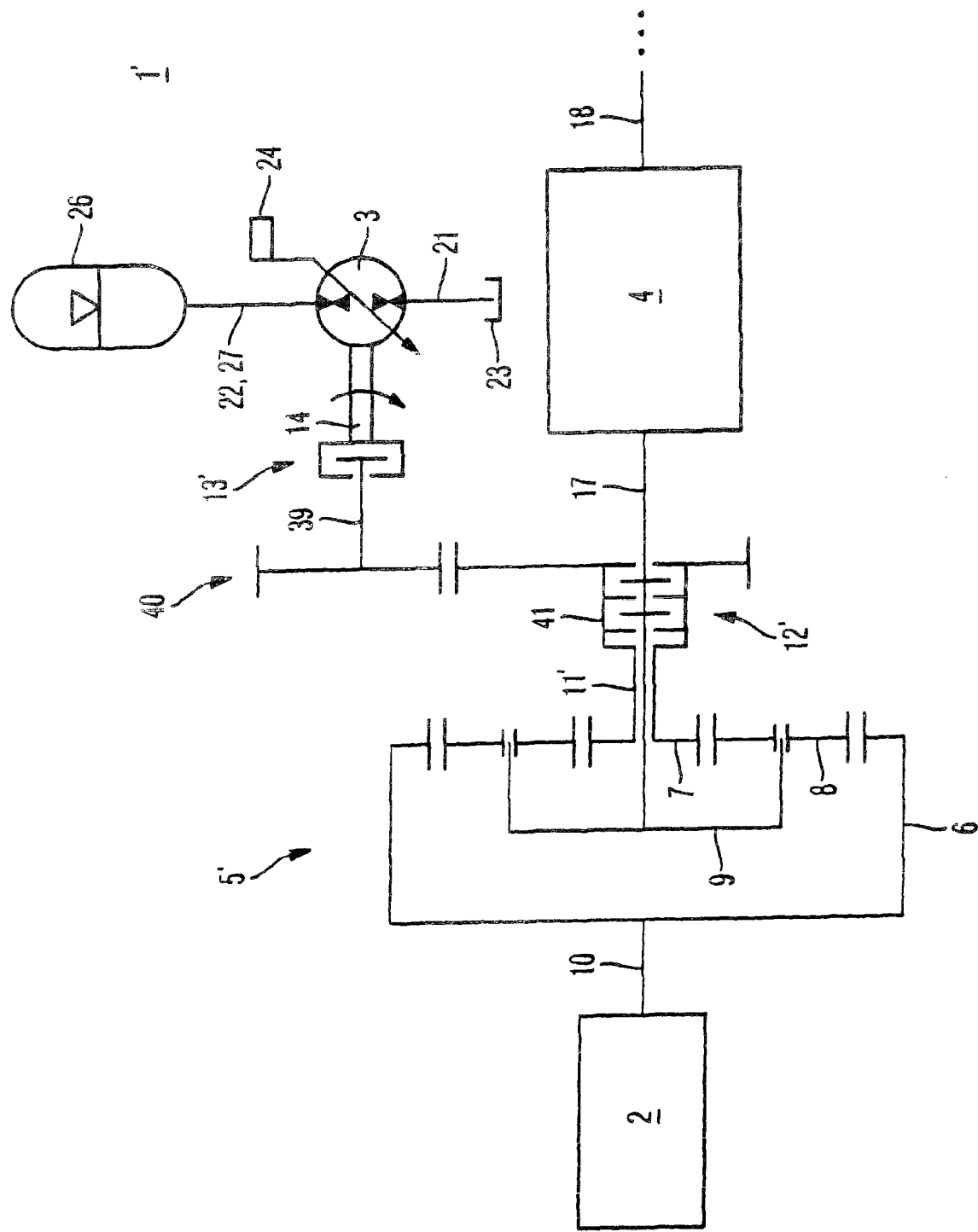
Figure 3:
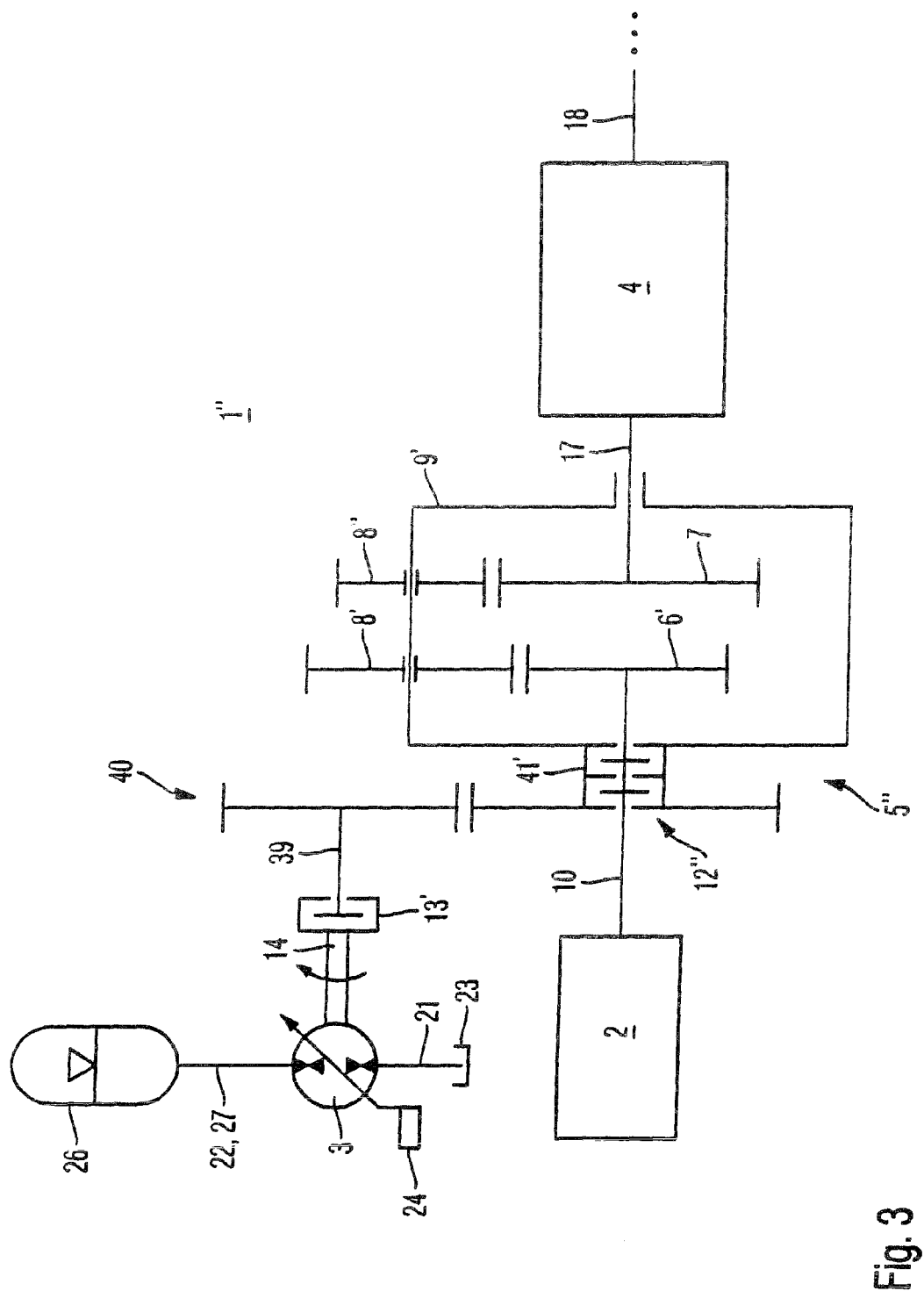

Preferred forms of implementation of the drive system according to the invention and of the method according to the invention of controlling the drive system are represented in the drawings and described in detail below. The drawings show:

FIG. 1 a first diagrammatic representation of a first form of construction of a drive system according to the invention for the purpose of explaining the method according to the invention;

FIG. 2 a second form of construction of the drive system according to the invention;

FIG. 3 a third form of construction of the drive system according to the invention;

FIG. 4 a diagram illustrating the rotational speed ratios during a starting- or shift operation;

FIG. 5 a simplified method sequence for starting a prime mover; and

FIG. 6 a simplified method sequence illustrating a gear change.

In FIG. 1 a diagrammatic representation of a drive system 1 according to the invention is illustrated. The drive system according to the invention comprises an internal combustion engine 2 as a prime mover. As a rule, i.c. engines of commercial vehicles take the form of diesel i.c. engines.

The drive system 1 further comprises a hydrostatic machine 3, which in the illustrated, preferred embodiment is a hydrostatic machine 3 that may be swivelled out of its neutral position in both directions, for example an axial piston machine. The hydrostatic piston machine may be used both as a motor and as a pump and operates in four-quadrant mode. A simplified construction arises with a hydrostatic machine that may be swivelled out in one direction only.

For transmitting power to a drive of a vehicle a shift transmission 4 is provided, which has at least two different transmission levels as gears, between which a change may be effected in a shift operation.

As a replacement for a conventionally used friction clutch or a hydrodynamic converter, an epicyclic gearbox 5 is disposed between the i.c. engine 2 and the shift transmission 4. The epicyclic gearbox 5 comprises three elements. The first element is a ring gear 6. The second element is a sun gear 7 and the third element is formed by the planet gears 8 and the one planet carrier 9. The planet gears 8 are in permanent mesh both with internal gearing of the ring gear 6 and with external gearing of the sun gear 7 and are mounted rotatably on the planet carrier 9.

The i.c. engine 2 is connected by a drive shaft 10 permanently to the ring gear 6. The ring gear 6 therefore rotates at an identical speed to the i.c. engine 2. In the first illustrated embodiment, to which reference is also made below for the explanation of the method according to the invention, the sun gear 7 is connected by a sun gear shaft 11 to the hydrostatic piston machine 3. The sun gear shaft 11 is connectable by means of a clutch 12 in a rotationally fixed manner to the ring gear 6. In the closed state of the clutch 12, therefore, the epicyclic gearbox 5 rotates as a rotating unit. A relative movement of the individual elements of the epicyclic gearbox 5 relative to one another is then not possible.

The association of the elements of the epicyclic gearbox 5 with i.c. engine 2, hydrostatic machine 3 and shift transmission 4 is by way of example. Other associations may be selected according to requirements.

For connecting the sun gear shaft 11 to the hydrostatic piston machine 3 a further clutch 13 is provided. The further clutch 13 in the closed state connects the sun gear shaft 11 to the shaft 14 that is permanently connected to the hydrostatic machine 3. In the closed state of the further clutch 13, the shaft 14 is connected in a rotationally fixed manner to the sun gear shaft 11. In a simpler form of implementation, it is also possible to dispense with the further clutch 13.

The planet carrier 9 is connected by a gear step 15 to the shift transmission 4. The shift transmission 4 has a transmission input shaft 17 that is connected in a rotationally fixed manner to an output gear 16. The output gear 16 meshes with external gearing that is disposed on the planet carrier 9.

The rotational speed of the transmission input shaft 17 is transformed in accordance with an engaged gear of the shift transmission 4 into a rotational speed of a transmission output shaft 18. The transmission output shaft 18 is connected to a differential gear 19. The differential gear 19 is a component part of a driven vehicle axle 20 and transmits the torque, which is supplied at the input side via the transmission output shaft 18, to drive shafts that are connected to the driven wheels of the driven axle 20.

The hydrostatic machine 3 has two line connections. A first line connection is connected to a tank line 21. The second line connection of the hydrostatic machine 3 is connected to a working line 22. In dependence upon the set displacement volume and displacement direction of the hydrostatic machine 3, pressure medium is either drawn in from the tank line 21 and delivered into the working line 22 or supplied through the working line 22 to the hydrostatic machine 3 and during operation of the hydrostatic machine 3 as a hydraulic motor is relieved through the tank line 21 to a tank volume 23.

For setting the displacement direction of the hydrostatic piston machine 3 and/or the flow direction as well as the displacement volume of the hydrostatic machine 3 an adjusting device 24 is provided. As the adjusting device 24 is of a conventional design, it is possible to dispense with a detailed description. The adjusting device 24 receives a control signal from an electronic control unit 32. In a corresponding manner, a displacement volume is set, for example by adjusting a swash plate in the case of a piston machine of a swash plate style of construction.

The drive system 1 represented in FIG. 1 comprises, in addition to the drive, a hydraulic system for implement operation. The hydrostatic machine 3 is connected by the working line 22 to a valve device 25. By means of the valve device 25 the hydrostatic machine 3 may be connected either to a hydraulic accumulator 26 or however to a hydraulic cylinder 31 that is represented by way of example. In dependence upon the respective operating situation of the drive system 1, the valve device 25 is actuated by the electronic control unit 32 in such a way that the working line 22 is connected either by an accumulator line 27 to the hydraulic accumulator 26 or to a second working line 29 or a third working line 30. The second working line 29 and the third working line 30 open out into in each case one working pressure chamber of the hydraulic cylinder 31.

In the illustrated embodiment, the hydraulic cylinder 31 is a double-acting hydraulic cylinder. The invention is not restricted to the represented hydraulic cylinder 31. Rather, different hydraulic consumers and, in particular, also a plurality of hydraulic consumers may be provided as a hydraulic system for implement operation.

The change of volume upon a movement of the piston in the hydraulic cylinder 31 is different in both actuating pressure chambers. To allow a volume compensation, the valve device 25 is further connected to a relief line 28. The relief line 28 opens out in a tank volume 23.

For acquiring the rotational speeds of the drive shaft 10 and a second element of the epicyclic gearbox 5, a first rotational speed sensor 33 and a second rotational speed sensor 34 are provided. The first rotational speed sensor 33 and the second rotational speed sensor 34 are connected by a first sensor line 35 and a second sensor line 36 respectively to the electronic control unit 32. In the illustrated embodiment, the second acquired rotational speed in the epicyclic gearbox 5 is the rotational speed of the sun gear shaft 11. To enable a simpler arrangement of the rotational speed sensor 34, the rotational speed sensor is disposed in the region of the shaft 14. The second rotational speed sensor 34 may however equally be disposed in the region of the sun gear shaft 11. This has the advantage that, even in the open state of the further clutch 13, it is possible to acquire the rotational speed of the sun gear shaft 11.

As is indicated merely by way of example by means of the further signal lines 38, still more parameters of the drive system 1 according to the invention are supplied to the electronic control unit 32. On the basis of these parameters, which include for example a signal relating to the effected engagement of another gear of the transmission 4, via control lines 37 the valve device 25 as well as the adjusting device 24 are activated. The activating of the valve device 25 and the adjusting device 24 is described in more detail below with reference to FIGS. 4 to 6.

For carrying out the necessary adjustments a central control unit 60 is moreover additionally provided. The central control unit 60 coordinates the adjustment of the prime mover 2 and the hydrostatic machine 3. For this purpose, the central control unit 60 is connected to the electronic control unit 32. Furthermore, an accelerator pedal position of an accelerator pedal 61 is supplied to the central control unit 60. The position of the accelerator pedal 61 is determined for example by means of an angle sensor 62 and supplied in the form of an electric signal to the central control unit 60.

The central control unit 60 is further connected to a diesel control unit 63. The diesel control unit 63 ultimately defines a setpoint rotational speed for the prime mover 2. The conversion may then be effected for example by regulating the injection quantity of a diesel engine as primary prime mover 2.

By means of the accelerator pedal 61 a user defines in each case a setpoint torque of the drive system 1. In dependence upon the charging condition of the hydraulic accumulator 26 that is acquired by means of a pressure sensor 27' in the accumulator line 27, the gear ratio and the pump size of the hydrostatic machine 3 there arises an available theoretical torque $M_{theor.}$, which is available by means of the hydrostatic machine 3. Information about this theoretical torque $M_{theor.}$ is communicated to the central control unit 60, as is represented in FIG. 1 by the dashed arrow between the electronic control unit 32 and the central control unit 60. Taking into account the information about the setpoint torque, which is defined by a user by means of the accelerator pedal 61, in a diesel characteristics map the diesel rotational speed, at which the torque of the prime mover 2 needed to convert the driver request is available, is determined. The central control unit 60 then determines a setpoint rotational speed for the prime mover 2 and transfers a corresponding rotational speed value to the diesel control unit 63. The diesel control unit 63 in turn then activates the prime mover 2 for example by selection of an injection quantity.

After a synchronization, the clutch 12 is closed so that the torque generated by the hydrostatic machine 3 and the prime mover 2 are added together. In this case, the torque, which may be generated by the hydrostatic machine 3 and which, besides the setting of the hydrostatic machine 3, is dependent upon the pressure in the hydraulic accumulator 26, is taken into consideration by the central control unit 60 when determining the torque that is to be realized by the prime mover 2. Given an empty hydraulic accumulator 26, driving is then effected exclusively by means of the prime mover 2. The electronic control unit 32, which is informed about the charging condition state of the hydraulic accumulator 26, then passes on to the central control unit 60 the information that a torque, which is to be added, is not realizable by means of the hydrostatic machine 3. The activation is accordingly effected exclusively via the central control unit 60 and the diesel control unit 63 that is provided for conversion of the request.

In FIG. 2 an alternative embodiment of the drive system 1' according to the invention is represented. In contrast to the simple diagrammatic example of FIG. 1, in the example according to FIG. 2 the drive shaft 10 and the transmission input shaft 17 are disposed coaxially with one another. Thus, in the shafts torques acting in radial direction are avoided.

In the system 1' represented in FIG. 2 the basic construction and, in particular, the method of controlling the drive system corresponds to the construction, already described in FIG. 1, of the drive system 1 shown there. A repeat description of identical elements, which are denoted by identical reference characters, is therefore not provided.

In contrast to the embodiment according to FIG. 1, in the embodiment of FIG. 2 the sun gear shaft 11' takes the form of a hollow shaft. The transmission input shaft 17 may therefore be passed through the sun gear shaft 11'. This allows the coaxial arrangement of the transmission input shaft 17 both with the sun gear shaft 11' and with the drive shaft 10. As in the first embodiment, the i.c. engine 2 is connected by the drive shaft 10 to the ring gear 6. The epicyclic gearbox 5' is fundamentally of an identical design to the epicyclic gearbox 5 of FIG. 1. As is the case there, the transmission input shaft 17 is connected to the planet carrier 9. The gear step 15 of the first embodiment however no longer applies.

For blocking the epicyclic gearbox 5', a clutch 12' is once again provided. The clutch 12' is designed as a friction clutch in the form of a multi-plate clutch and comprises a clutch cage 41, which is connected in a rotationally fixed manner to the sun gear shaft 11. In the clutch cage 41 clutch plates are disposed and connected in a rotationally fixed manner to the clutch cage 41. Disposed between the clutch plates connected in a rotationally fixed manner to the clutch cage 41 are clutch linings, which are connected in a rotationally fixed manner to the transmission input shaft 17. In the engaged state, the clutch 12' therefore connects the transmission input shaft 17 to the sun gear shaft 11' in that the clutch plates and clutch linings are pressed axially against one another. Thus, the planet carrier 9 and the sun gear 7 are connected in a rotationally fixed manner to one another and the epicyclic gearbox 5 is blocked.

The hydrostatic machine 3 is connected by a further clutch 13' to an intermediate shaft 39. The intermediate shaft 39 interacts via a further transmission step 40 with the clutch cage 41. For this purpose, a gear wheel is disposed in each case a clutch cage 41 as well as on the intermediate shaft 39, these gear wheels being in permanent mesh with one another.

To determine the closing instant of the clutch 12', the rotational speeds of the planet carrier 9 and the sun gear 7 and/or the rotational speed ratio are/is determined. This may be effected either directly by measuring the rotational speeds of the sun gear shaft 11' and the transmission input shaft 17 or computationally, if for example the rotational speed of the intermediate shaft 39 is acquired.

To simplify the representation, a hydraulic system for implement operation that is connectable by the valve device 25 to the hydrostatic piston machine 3 has been omitted. It is however perfectly obvious that, in the second embodiment represented in FIG. 2 too, instead of the illustrated direct connection from the hydrostatic piston machine 3 to the hydraulic accumulator 26 a valve device 25 may be provided.

A further embodiment of a drive system 1" is represented in FIG. 3. FIG. 3 differs fundamentally in the construction of the epicyclic gearbox 5'' from the epicyclic gearboxes 5, 5' that are designed with a ring gear 6.

Instead of the ring gear 6, the drive shaft 10 now interacts with a centrally disposed drive gear 6'. The drive gear 6' replaces the ring gear 6 and interacts with first planet gears 8'. Instead of the merely one represented planet gear 8', a plurality of such first planet gears 8' are arranged distributed over the circumference. The first planet gears 8' are disposed rotatably on axles of the planet carrier 9'. Provided coaxially with the first planet gears 8' are second planet gears 8''. The second planet gears 8'' are likewise disposed rotatably on the axles of the planet carrier 9. The second planet gears 8'' are in permanent mesh with the sun gear 7. The sun gear 7 in the illustrated third embodiment is connected to the transmission input shaft 17.

For blocking the epicyclic gearbox 5'' according to the third embodiment a clutch 12'' is once again provided. The third clutch 12'' is likewise designed as a multi-plate clutch and corresponds in its construction to that of the second embodiment of FIG. 2. The planet carrier 9' is connected in a fixed manner to the clutch cage 41' of the clutch 12''. In the closed state of the clutch 12'', therefore, the planet carrier 9 is connected in a rotationally fixed manner to the drive shaft 10 and so the epicyclic gearbox 5'' is blocked.

The further construction of the drive system 1'' corresponds to that of FIG. 2, so that it is possible to dispense with a repeat detailed description.

The method of controlling the drive systems 1, 1', 1'' is now described with reference to FIGS. 4 to 6 and on the basis of the first example of the drive system 1 of FIG. 1 that is represented in FIG. 1.

In FIG. 4 the rotational speed ratios of the elements of the epicyclic gearbox 5 are represented. There now follows a description of the change of the rotational speeds of the individual elements for the example of a starting operation.

Before the vehicle pulls away, the i.c. engine 2 rotates at a specific speed. This point is denoted in FIG. 4 by $P_0$. The shift transmission 4 is situated in its neutral position and the planet carrier 9 is stationary ($P_4$). The rotational speed difference between the ring gear 6 and the planet carrier 9 is compensated by means of the sun gear 7, which rotates ($P_1$) in a direction of rotation and at a speed arising from the transmission ratio of the epicyclic gearbox 5. At the beginning of a starting operation the hydrostatic machine 3 is adjusted to a vanishing displacement volume, provided it is not already set to a vanishing displacement volume. A method sequence having the essential steps regarding a starting operation and/or the shift to a higher gear is represented in FIG. 6. The adjusting of the hydrostatic machine 3 to a vanishing displacement volume is indicated in step 50.

In this state with the hydrostatic machine 3 swivelled to zero, the epicyclic gearbox 5 is torque-free and a gear may be engaged in the shift transmission 4 (step 51). The planet carrier 9 is still stationary and the rotational speed compensation between the stationary planet carrier and the drive shaft 10 rotating for example at rated speed is compensated by a contra-rotation of the sun gear shaft 11. The clutch 13 is closed and the shaft 14 is driven at the rotational speed corresponding to the rotational speed of the sun gear shaft 11. The hydrostatic machine 3 is set to a vanishing displacement volume and is then swivelled out by the adjusting device 24 in the direction of an increasing displacement volume. The working line 22 at the start of adjustment of the displacement volume is connected by the valve device 25 to the accumulator line 27. For defining the correct instant, the electronic control unit 32 receives a signal from the shift transmission 4 that the gear is engaged. With progressive outward swivelling of the hydrostatic machine 3 (step 52) and progressive charging of the hydrostatic accumulator 26, the resistance, against which pressure medium has to be delivered by the hydrostatic machine 3, increases. The pressure medium that is delivered by the hydrostatic piston machine 3 is delivered into the hydraulic accumulator element 26. For this purpose, the working line 22 is connected by the valve device 25 to the accumulator line 27. The activating of the valve device 25 is carried out likewise by the electronic control unit 32.

As a result of the hydraulic accumulator 26 being filled up, the hydrostatic machine 3 is decelerated. The rotational speed of the hydrostatic machine 3 and hence the rotational speed of the sun gear 7 reduces along the line 43 to the point $P_2$. The deceleration occurs as a result of an increase of the torque acting, as a result of the accumulator pressure, upon the hydrostatic machine 3. Consequently, the planet carrier 9 is increasingly accelerated in the same direction as the direction of rotation of the ring gear 6 and the vehicle pulls away. The further increase in torque owing to the charging operation of the hydraulic accumulator 26 at some point in time exceeds the load torque. Consequently, the flow direction of the pressure medium reverses, and pressure medium is fed from the hydraulic accumulator 26 to the hydrostatic machine 3. The hydrostatic machine 3 reverses its direction of rotation, and the epicyclic gearbox 5 acts as a summarizing gear. In this case, the torques of the hydrostatic machine 3 and the i.c. engine 2 are added together and supplied to the transmission input shaft 17. With progressive acceleration of the sun gear 7, which now rotates in the same direction as the drive shaft 10 and hence the ring gear 6, leads in a synchronization instant to a rotational speed equality of the rotational speed of the sun gear 7 ($n_{sun}$) and the rotational speed of the ring gear 6 ($n_{ringgear}$, step 53).)

In order to detect such a synchronous speed, the signal of the first rotational speed sensor 33 and the signal of the second rotational speed sensor 34 are supplied to the electronic control unit 32. If the synchronous speed is detected, then the clutch 12 is closed and so the epicyclic gearbox 5 is blocked (step 54). If there is still pressure energy stored in the hydraulic accumulator 26, this may be used for further acceleration.

If the hydraulic accumulator 26 is empty or if the available pressure is so low that a meaningful utilization is not possible, then the further clutch 13 may be opened in order to avoid loss. In this hydrostatic machine 3 is uncoupled from the epicyclic gearbox 5 and losses as a result of the coupled motion of the hydrostatic piston machine 3 are avoided. In order to assist the synchronization, the closing of the clutch 12 may also be effected simultaneously with the adjustment of the displacement volume of the hydrostatic machine 3.

As has already been pointed out, at the beginning of the starting operation the i.c. engine 2 is situated at the point $P_0$. For the rotational speed compensation, the sun gear 7 rotates in the opposite direction at the speed indicated at the point $P_1$. As the displacement volume increases, the rotational speed of the sun gear 7 shifts along the line 43 in the direction of the point $P_2$. As a result of the increasing load on the i.c. engine 2, the rotational speed drops slightly along the line 42 in the direction of $P_6$. Once the stationary state of the sun gear 7 and hence of the hydrostatic machine 3 has been reached, because of the applied accumulator pressure on the hydrostatic machine 3 the direction of rotation of the hydrostatic machine 3 reverses, and the torque generated by the hydrostatic machine 3 is supplied via the sun gear 7 to the epicyclic gearbox 5. The further acceleration ensures that at the point $P_3$ the sun gear 7 and the ring gear 6 rotate in the same direction as one another. As soon as the rotational speeds of the sun gear 7 and the ring gear 6 are identical, or are in another defined relationship to one another, the clutch 12 is closed and the epicyclic gearbox 5 is blocked. This is indicated by the horizontal line 56 in FIG. 4. A further acceleration is carried out by a rotational speed increase on the part of the i.c. engine 2. This leads to a parallel shift of the line 56 in the direction of the maximum rotational speed.

An alternative criterion for the closing of the clutch 12 may be reached for example when the point $P_6$ is reached by the ring gear 6 and the point $P_3$ by the sun gear 7. The clutch 12 is then closed and by means of the friction elements the synchronization is accomplished.

The previous explanations also apply in a corresponding manner to a gear change. In the event of an upshift from first to second gear for example, then in an identical manner a rotational speed difference between the input shaft, i.e. the drive shaft 10, and the output shaft, i.e. the transmission input shaft 17, has to be compensated. For the gear change, therefore, first the clutch 12 is closed and the hydrostatic machine 3 is set to a vanishing displacement volume. The epicyclic gearbox 5 is therefore again torque-free and the rotational speed compensation during the gear change is effected by acceleration of the sun gear 7. Once the new gear has been engaged, the displacement volume of the hydrostatic machine 3 is increased again, as it was during the starting operation. The further procedure corresponds to that of the starting operation.

A corresponding procedure is followed for a downshift. Here too, first the clutch 12 is disconnected and as a result of swivelling of the hydrostatic machine 3 to a vanishing displacement volume the epicyclic gearbox 5 is switched to a torque-free state. After engagement of the lower gear in the shift transmission 4, the hydrostatic machine 3 is reset to a displacement volume differing from zero. The hydraulic accumulator 26 is charged and, on account of the pressure energy that is then supplied to the hydraulic accumulator 26, the transmission input shaft 17 is decelerated. For the downshift, therefore, a hydrostatic braking operation occurs.

The pressure energy stored because of the synchronization is preferably returned during the vehicle acceleration by means of a torque addition in the closed state of the clutch 12. Alternatively, the pressure energy may be utilized in the working circuit.

In FIG. 5 the method sequence for hydrostatic starting of the i.c. engine 2 is represented. First, the planet carrier 9 is blocked (step 45). Then the clutch 12 is opened and the further clutch 13 is closed (step 46). The hydrostatic machine 3 is swivelled out until, because of the pressure energy stored in the hydraulic accumulator 26, an adequate torque may be supplied at the shaft 14 (step 47). Via the electronic control unit 31 the valve device 25 is activated in such a way that the accumulator line 27 is connected to the working line 22 (step 48). Once the i.c. engine 2 has been successfully started, the displacement volume of the hydrostatic piston machine 3 is reset to zero displacement volume (step 49).

As a rule, starting of the i.c. engine 2 is followed by a drive-away operation as has already been described above with reference to FIG. 6.

FIGS. 5 and 6 refer to the embodiment represented in FIG. 1. It should however be noted that, in the case of the embodiment 3 of FIG. 3, instead of the planet carrier for starting the transmission input shaft and/or the sun gear 7 of the epicyclic gearbox 5" has to be blocked.

The invention is not restricted to the illustrated embodiment. Rather, in particular combinations of individual features of the illustrated embodiments are possible.

The invention claimed is:

1. A method of controlling a drive comprising a prime mover connected to a first element of an epicyclic gearbox, a shift transmission connected to a second element of the epicyclic gearbox, and a hydrostatic machine connected to a third element of the epicyclic gearbox, the method comprising:
adjusting the hydrostatic machine to a vanishing displacement volume ($V_{hM}$),
engaging a gear of the shift transmission,
increasing the displacement volume ($V_{hM}$) and charging a hydraulic accumulator until a torque equilibrium is reached at the hydrostatic machine,
further increasing the displacement volume ($V_{hM}$) of the hydrostatic machine and discharging the hydraulic accumulator via the hydrostatic machine,
acquiring a rotational speed difference between two elements of the epicyclic gearbox, and
closing a clutch to block the epicyclic gearbox.

2. The method according to claim 1, wherein, to supply a hydraulic system for implementing operation with pressure medium by means of the hydrostatic machine, the shift transmission is brought into a neutral position and the epicyclic gearbox is blocked by closing the clutch.

3. The method according to claim 1, wherein for a travel operation without energy recovery, the hydrostatic machine is uncoupled from the epicyclic gearbox by means of a further clutch.

4. The method according to claim 1, wherein for a gear change in the shift transmission, first the clutch is opened and the hydrostatic machine is set to a vanishing displacement volume ($V_{hM}$).

5. The method according to claim 1, wherein for assisting the synchronization in the epicyclic gearbox, friction elements of the clutch are applied against one another with increasing pressing force.

6. The method according to claim 1, wherein for starting the prime mover, the hydrostatic machine is set to a displacement volume ($V_{hM}$) differing from zero and the element of the epicyclic gearbox that is connected to the shift transmission is blocked.

7. The method according to claim 1, wherein in dependence upon the operating situation, the hydrostatic machine is connected to the hydraulic accumulator or to a hydraulic system for implementing operation.

* * * * *